(12) United States Patent
Wells

(10) Patent No.: US 6,901,192 B2
(45) Date of Patent: May 31, 2005

(54) CABLE STRENGTH MEMBER

(75) Inventor: Leslie Harrell Wells, Hudson, NC (US)

(73) Assignee: Neptco Incorporated, Pawtucket, RI (US)

( * ) Notice: Subject to any disclaimer, the term of this patent is extended or adjusted under 35 U.S.C. 154(b) by 24 days.

(21) Appl. No.: 10/298,489

(22) Filed: Nov. 18, 2002

(65) Prior Publication Data

US 2004/0096168 A1 May 20, 2004

(51) Int. Cl.$^7$ ................................................. G02B 6/44
(52) U.S. Cl. ........................ 385/113; 385/103; 385/106; 385/107
(58) Field of Search ................................ 385/101, 109, 385/113

(56) References Cited

U.S. PATENT DOCUMENTS

| | | | | |
|---|---|---|---|---|
| 4,076,382 A | | 2/1978 | Oestreich | 350/96.23 |
| 4,269,024 A | | 5/1981 | Ashpole et al. | 57/232 |
| 4,626,067 A | | 12/1986 | Watson | 350/96.2 |
| 4,693,551 A | | 9/1987 | Blanco et al. | 350/96.23 |
| 5,044,722 A | * | 9/1991 | Voser | 385/113 |
| 5,229,433 A | * | 7/1993 | Schunck et al. | 522/96 |
| 5,389,442 A | | 2/1995 | Arroyo et al. | 428/396 |
| 5,673,235 A | | 9/1997 | Miller | 367/20 |
| 5,822,485 A | | 10/1998 | Nelson et al. | 385/112 |
| 5,827,612 A | * | 10/1998 | Girgis | 428/378 |
| 5,838,864 A | | 11/1998 | Patel et al. | 385/113 |
| 5,925,462 A | * | 7/1999 | Girgis | 428/392 |
| 6,273,621 B1 | | 8/2001 | Eslambolchi et al. | 385/95 |
| 6,519,397 B2 | * | 2/2003 | Priest et al. | 385/109 |

* cited by examiner

Primary Examiner—John D. Lee
Assistant Examiner—Tina M Lin
(74) Attorney, Agent, or Firm—Mintz, Levin, Cohn, Ferris, Glovsky and Popeo, P.C.

(57) ABSTRACT

A nonmetallic, nonconductive strength member for use in a cable or as a component of a strength reinforcement system of a cable is provided. The strength member is constructed of low cost materials and includes multiple glass fibers coated with a coating composition. The strength member provides flexibility and high tensile strength. The strength member exhibits low smoke generation and low flammability properties. The coating composition includes at least a lubricant that imparts a substantially smooth surface and a low coefficient of friction to the glass fibers to help facilitate processing of the strength member(s) during cabling and stranding procedures. The coating composition also includes at least an adhesive component that helps to substantially adhere the glass fibers together and helps to form the glass fibers into the strength member. The strength member can be configured as a yarn or as a strand for incorporation within a cable and/or for arrangement with one or more cable components.

60 Claims, 6 Drawing Sheets

TABLE 1

| | OXYGEN INDEX TESTS | |
|---|---|---|
| | GLASS FIBER YARN | ARAMID |
| 20% OXYGEN | PASSED | PASSED |
| 22% OXYGEN | PASSED | PASSED |
| 23% OXYGEN | PASSED | FAILED BURNED CONTINUOUSLY |
| 25% OXYGEN | PASSED | FAILED |
| 30% OXYGEN | PASSED | FAILED |
| 35% OXYGEN | PASSED, DID NOT BURN BUT WOULD MELT AND FUSE | FAILED |
| 40% OXYGEN | PASSED, DID NOT BURN BUT WOULD MELT AND FUSE | FAILED |

NOTE: SAME AMOUNT BY WEIGHT WAS USED OF BOTH PRODUCTS TO PERFORM THE REQUIRED TESTING

Fig. 4

CABLE STRENGTH MEMBER

FIELD OF THE INVENTION

The invention relates to a strength member for use with a cable.

BACKGROUND OF THE INVENTION

Fiber optic cable has become a preferred medium for transmitting data and telecommunications signals over long distances. Glass or plastic optical fibers serve as the transmission medium of fiber optic cable. Optical fibers are relatively thin and fragile in comparison to other media and are particularly susceptible to tensile stress, in particular, during cable processing and manufacturing. Tensile stress can change the optical characteristics of optical fibers and can adversely affect the transmission performance of a fiber optic cable.

Strength members, e.g., rigid strength rods and flexible strength tapes or yarns, as well as strength reinforcement systems, e.g., arrangements and/or combinations of rigid and/or flexible strength members, are used in cable systems. Strength members add strength and provide flexibility to a cable and its components. Flexible strength members, e.g., strength yarns, are particularly suited for adding strength to and reinforcing cable components, e.g., optical fibers. Strength yarns can help to protect optical fibers against stress caused by an excessive tensile load to a cable. Strength yarns are typically constructed of materials having sufficient strength and flexibility for responding to a tensile load. When a cable receives an excessive tensile load, strength yarns can respond to the tensile stress by twisting and undulating to thereby absorb the stress load and to help protect the optical fibers.

Strength yarns are provided in various shapes and compositions, and can be integrated into a variety of cable designs. Strength yarns can be stranded into a cable to extend linearly along a central axis of the cable and/or to wrap helically around a cable core. Strength yarns can be integrated and/or stranded with one or more components of a strength reinforcement system added to a cable to provide strength and protection. In addition, strength yarns can be stranded with and/or around optical fiber buffer tubes and extend with the optical fibers along a central axis of a fiber optic cable.

Flexible strength members and reinforcement systems are typically constructed of such materials as plastics, fiberglass reinforced plastics, polyesters, polyethylene, high strength polyethylene and aramid fibers. Many of these materials, however, are relatively expensive, e.g., high strength polyethylene or aramid fibers. In addition, many of the materials are relatively susceptible to thermal damage and generate smoke and ignite when exposed to high temperatures and/or a continuous flame, e.g., plastics, polyester and aramid fibers. These materials can render cable installations and, in particular, indoor cable of inter- and intra-building networks, vulnerable to high temperatures and fire damage. To reduce the flammability of indoor cable systems, strength materials are often coated with flame retardant compounds, e.g., fluorinated polymers and TEFLON®, which add considerable cost to cable designs.

Therefore, it is desirable to provide a strength member constructed of low cost materials for providing tensile strength and flexibility to a cable and its components. It is desirable to provide a strength member for use with a cable and its components that exhibits low flammability and low smoke generation properties.

SUMMARY OF THE INVENTION

An object of the invention is to provide an improved strength member for use in a cable, e.g., a fiber optic or copper data or communications cable, and/or for use in a cable reinforcement system. Another object of the invention is to provide a low cost strength member having a relatively high tensile (break) strength for use in a cable and/or a cable reinforcement system. Another object of the invention is to provide a strength member having low smoke generation and low flammability properties for use in a cable and/or a cable reinforcement system. A further object of the invention is to provide a strength member with a substantially smooth surface coat having a low coefficient of friction. The low coefficient of friction helps to facilitate processing of the strength member with a cable and one or more cable components during a cabling and/or stranding process. Still another object of the invention is to provide a flexible strength member for use in a cable and/or a cable reinforcement system to help impart flexibility to a cable and/or its components, while strengthening and reinforcing the cable and/or its components.

The invention provides a strength member for use with a cable. The strength member comprises a yarn including a plurality of elongated glass fibers arranged substantially parallel to one another along a central axis of the yarn. Each glass fiber is substantially coated with a coating. The coating including at least a first component that forms a substantially smooth coat on each glass fiber and at least a second component that renders each glass fiber flexible to form the plurality of glass fibers into the yarn, wherein the coating is present at a percentage by weight of less than about 5 percent.

Implementations of the invention may include one or more of the following features. The plurality of glass fibers is present at a percentage by weight of greater than about 95 percent and the coating is present at a percentage by weight of less than about 5 percent. The plurality of glass fibers is present at a percentage by weight of greater than about 98 percent. The coating is present at a percentage by weight of less than about 2 percent. The yarn generates substantially minimal smoke when in contact with a continuous flame. The yarn does not ignite when in contact with a continuous flame in an atmosphere in which oxygen is present in a concentration of less than about 40 percent. The yarn includes a tensile strength of from about 50 to about 1,150 Newtons. The yarn includes a minimum tensile strength of greater than about 50 Newtons.

The yarn generates substantially minimal smoke and does not ignite when in contact with a continuous flame in an atmosphere in which oxygen is present in a concentration of less than about 40 percent. The yarn includes a tensile strength of from about 50 to about 1,150 Newtons, or includes a minimum tensile strength of greater than about 50 Newtons.

Implementations of the invention may further include one or more of the following features. The first component of the coating combination is selected from the group consisting of a resin, an adhesive, an acrylic, an acrylic resin, an acrylic emulsion, polyurethane, styrene butadiene rubber, latex, and any combination thereof. The first component includes RHOPLEX® E-358. The first component is present at a concentration of from about 10 to about 90 percent by weight. The first component is present at a concentration of from about 60 to about 85 percent by weight. The second component of the coating composition is selected from the group consisting of a lubricant, a wax, silicone, a textile finish, a starch-based sizing, an acrylic, an acrylic emulsion, polyacrylamide, and any combination thereof. The second component includes MARSOFT™ NPE-20. The second component is present at a concentration of from about 10 to about 90 percent by weight. The second component is present at a concentration of from about 10 to about 30 percent by weight. The first component is present at a concentration of from about 60 to about 85 percent by weight and the second component is present at a concentration of from about 10 to about 30 percent by weight.

In addition, the plurality of glass fibers is selected from the group consisting of E-glass fibers, ECR-glass fibers, S-glass fibers, continuous glass fibers, and any combination thereof. The strength member includes a denier of from about 2,500 and to about 22,000, or from about 3,500 to about 4,000.

The invention provides a method for making an elongated strength member for use in a cable. The method comprising providing a plurality of elongated glass fibers; providing a coating including at least a first component that forms a substantially smooth coat on each glass fiber and at least a second component that renders each glass fiber flexible to form the plurality of glass fibers into the yarn; coating the plurality of glass fibers with the coating to substantially coat each glass fiber; arranging the plurality of glass fibers substantially parallel to one another; forming the plurality of glass fibers into an elongated yarn; and drying the coating, wherein the coating is present at a percentage by weight of less than about 5 percent. Implementations of the method can include the plurality of glass fibers is present at a percentage by weight of greater than about 95 percent, and the coating is present at a percentage by weight of less than about 5 percent.

A cable is provided by the invention comprising a cable jacket, the cable jacket defining an interior having elongated generally circular cylindrical shape; a core disposed within the cable jacket interior to extend longitudinally along a center axis of the cable jacket; one or more conductors disposed within the cable jacket interior and arranged around the core such that the one or more conductors extend longitudinally along the center axis of the cable jacket; and one or more strength members disposed within the cable jacket interior extending longitudinally along the center axis of the cable jacket, wherein each of the one or more strength members. The one or more strength members includes a plurality of elongated glass fibers arranged substantially parallel to one another along a central axis of the yarn, each glass fiber being substantially coated with a coating, the coating including at least a first component that forms a substantially smooth coat on each glass fiber and at least a second component that renders each glass fiber flexible to form the plurality of glass fibers into the yarn, wherein the coating is present at a percentage by weight of less than about 5 percent. Implementations of the cable can include the plurality of glass fibers plurality of glass fibers is present at a percentage by weight of greater than about 95 percent and the coating is present at a percentage by weight of less than about 5 percent.

The invention also provides a cable comprising a cable jacket, the cable jacket defining an interior having an elongated generally circular cylindrical shape; one or more conductors disposed within the cable jacket interior such that the one or more conductors extend along longitudinally along a center axis of the cable jacket; and one or more strength members disposed and arranged among the one or more conductors such that the one or more strength members extend longitudinally along the center axis of the cable jacket, wherein each of the one or more strength members. The one or more strength members includes a plurality of elongated glass fibers arranged substantially parallel to one another along a central axis of the yarn, each glass fiber being substantially coated with a coating, the coating including at least a first component that forms a substantially smooth coat on each glass fiber and at least a second component that renders each glass fiber flexible to form the plurality of glass fibers into the yarn, wherein the coating is present at a percentage by weight of less than about 5 percent. Implementations of the cable can include the plurality of glass fibers is present at a percentage by weight of greater than about 95 percent, and the coating is present at a percentage by weight of less than about 5 percent.

Various aspects of the invention may provide one or more of the following advantages. Low cost materials, e.g., glass fibers, can be used to construct a nonmetallic and nonconductive strength member for use with a cable and/or for use in a strength reinforcement system to add strength to a cable and one or more cable components. Cable and cable components, e.g., optical fibers, can be protected from the effects of tensile stress. A strength member or a cable reinforcement system can be provided that helps to add flexibility to the cable. Low smoke generation and low flammability properties can be imparted to a strength member and/or a cable reinforcement system. A low coefficient of friction of a strength member and/or a cable reinforcement system can help to facilitate cabling and stranding processes during manufacturing.

These and other advantages of the invention, along with the invention itself, will be more fully understood after a review of the following figures, detailed description, and claims.

BRIEF DESCRIPTION OF THE FIGURES

FIG. 4 includes Table I reporting results of oxygen index tests.

DETAILED DESCRIPTION OF PREFERRED EMBODIMENTS

Figure 1:
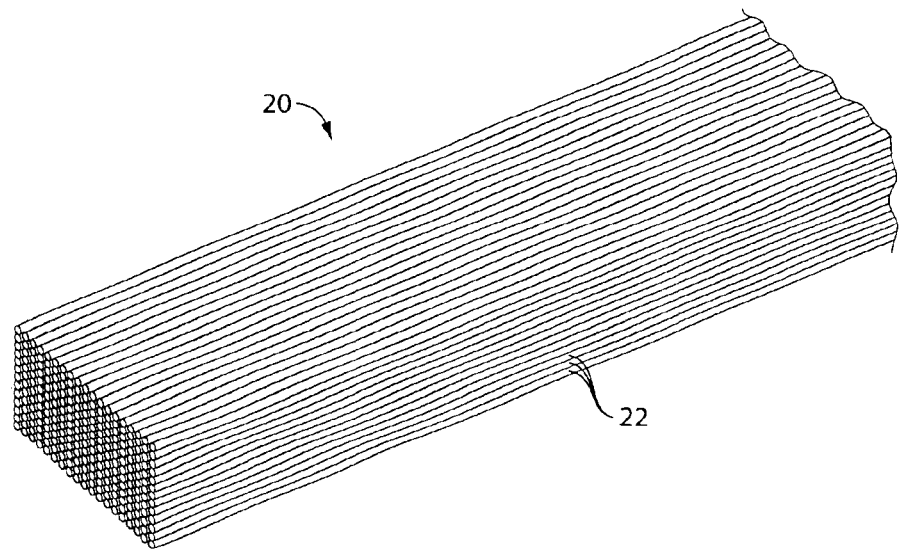
FIG. 1 is a perspective view of a strength member including a plurality of glass fibers and having a substantially rectangular-like cross-section.
Figure 2:
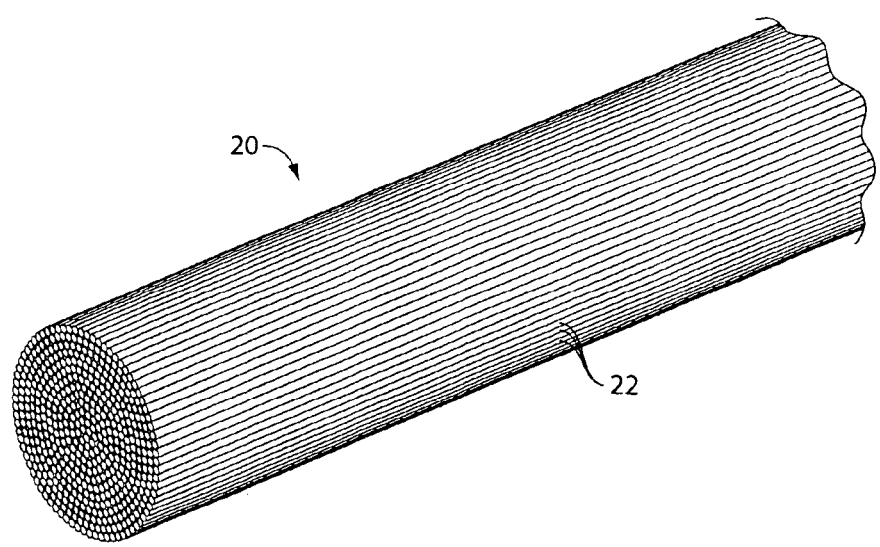
FIG. 2 is a perspective view of a strength member including plurality of glass fibers and having a substantially circular cross-section.

Referring to FIGS. 1–2, in one aspect, the invention provides a nonmetallic roving 20 for use as a strength member of a cable, e.g., a fiber optic or copper data or communications cable, and/or for use as a component of a cable reinforcement system of a cable. The roving 20 includes a plurality of unidirectional elongated glass fibers 22 and/or a fibrous glass material formed into a yarn 20. The glass fibers 22 can be disposed and arranged substantially parallel to one another along a central axis of the yarn 20. The yarn 20 can be configured with a substantially flat configuration having a rectangular-like cross-section, as shown in FIG. 1. Alternatively, the glass fibers 22 can form a strand 20 configured with a substantially circular cross-section, as shown in FIG. 2. The fibrous glass material can be conformed into the yarn 20 or the strand 20 configuration, as shown in FIGS. 1–2. Other embodiments are within the scope of the invention.

Each of the glass fibers 22 is substantially coated with a coating composition, e.g., all of, at least most of or a portion of a surface of each glass fiber 22 is coated with the coating composition. The coating composition, as described below in further detail, helps to impart certain physical and mechanical properties to the glass fibers 22 and thereby to the roving 20.

The glass fibers 22 include nonconductive glass fibers suitable for adding tensile strength to a cable and/or to cable components, e.g., optical fibers, and for constructing the roving 20 having a tensile (break) strength of from about 50 Newtons to about 1,150 Newtons.

In addition, the glass fibers are suitable for providing flexibility to the roving 20 such that when a tensile load is applied to a cable, the roving 20 resists the tensile stress to thereby help to protect the cable and its components and to mitigate the effects of the tensile load. Suitable glass fibers are thermal resistant and flame retardant to help impart low flammability properties to the roving 20 such that the roving 20 will not readily burn and produce smoke when exposed to a continuous flame. The glass fibers are lightweight to help minimize a weight of a strength member or a strength reinforcement system integrated with a cable. The glass fibers are low cost for minimizing manufacturing costs and for providing economy. Suitable material includes, but is not limited, E-glass fibers, ECR-glass fibers and S-glass fibers, continuous glass fibers, and any combination thereof.

The roving 20 includes from about 1,000 to about 2,500 glass fibers 22, and preferably about 1,600 glass fibers. It is understood, however, that the invention is not limited to a certain number of fibers or a specific range of denier as disclosed, but anticipates that the roving 20 can include more or less glass fibers at greater or smaller denier to add strength and/or to add flexibility to the roving 20 sufficient for a certain cable design or reinforcement application. The roving 20 can include a width of at least from about 1.07 mm to about 1.47 mm, and a thickness of at least from about 0.152 mm to about 0.178 mm. A yield or weight of the roving 20 (yards/pound of glass) can include from about 675 yd/lb to about 1260 yd/lb.

As described below in further detail, a surface of each glass fiber 22 is substantially coated, e.g., all of, at least most of or a portion of a surface of each glass fiber 22 is coated, with the coating composition to form an outer surface coat on each glass fiber 22. The coating composition includes at least a first component suitable for providing a substantially smooth coat, e.g., a coat substantially devoid of seams, wrinkles, sharp edges, crevices, particles and particulate matter, on the surface of each glass fiber 22. The smooth surface coat of the glass fibers 22 helps to provide the roving 20 with a low coefficient of friction. The low coefficient of friction helps to facilitate processing of the roving 20 with a cable or with one or more cable components. The smooth surface coat of the glass fibers 22 and the resulting low coefficient of friction of the roving 20 enable the roving 20 and the cable components to slide over/under each other with less friction as the roving 20 and the components are fed over/under each other in a stranding and/or cabling process during cable manufacture.

The first component can further include one or more components suitable for helping to prevent breaking and fraying of the glass fibers 22 during formation of the roving 20 and during cable processing. The one or more components are suitable for adding weight to the glass fibers 22 sufficient to help prevent or to at least minimize/reduce slipping and separating of the glass fibers 22, e.g., flying apart from one another. In addition, the one or more components are suitable for substantially adhering the glass fibers 22 together, e.g., to form the yarn 20 or the strand 20 while remaining separable, e.g., manually, from one another. The first component can include, but is not limited to, a resin, an adhesive, an acrylic, an acrylic resin, an acrylic emulsion, polyurethane, styrene butadiene rubber, latex, and any combination thereof.

In addition, the coating composition further includes at least a second component that is suitable for lubricating and for softening the glass fibers 22 to help prevent breaking of the glass fibers 22 and to help impart flexibility and conformability to the glass fibers 22. The second component can include one or more components suitable for helping to shape or form the glass fibers into the roving 20. The second component includes, but is not limited to, a lubricant, e.g., silicone or wax, a textile finish, e.g., a starch-based sizing, an acrylic, an acrylic emulsion, polyacrylamide, and any combination thereof.

In one embodiment, the first component of the coating composition can include, but is not limited to, a resin, such as a water-based acrylic resin emulsion known as RHOPLEX® E-358, available from Rohm & Haas of Philadelphia, Pa. The second component can include, but is not limited to, a lubricant, such as a water-dispersed polyacrylamide emulsion known as MARSOFT™ NPE-20, available from Marlin Company of Lenoir, N.C. The MARSOFT™ NPE-20 is present in the coating composition from about 10% wt to about 90% wt, and preferably, although not limited to, from about 10% wt. to about 30% wt. The RHOPLEX® E-358 is present in the coating composition from about 10% wt to about 90% wt, and preferably, although not limited to, from about 60% wt to about 85% wt.

By way of example, in one embodiment, the roving 20 is produced with a relatively high tensile (break) strength including about 1,600 E-glass fibers 22 having a denier from about 3545 to about 3965 (gms/9000 meter) and coated with the coating composition including from about 10 to about 30% wt of the MARSOFT™ NPE-20 and from about 60 to about 85% wt of the RHOPLEX® E-358. The resulting roving 20 can exhibit a minimum tensile (break) strength of from about 182.4 Newtons (N) or about 41 (lbs.) at a specific elongation (LASE) of about 2%. Elongation/strain performance tests demonstrate that the roving 20 can exhibit a minimum LASE at about 0.5% of about 15.2 lbs., and a minimum LASE at about 1.0% of about 30.7 lbs.

The resulting roving 20 includes the plurality of glass fibers 22 at greater than about 95 percent by wt (% wt.), and preferably at greater than about 98% wt., and the coating at less than about 5% wt., and preferably at less than about 2% wt. The roving 20, therefore, includes a substantial percentage of inert material and a relatively smaller percentage of active and/or flammable material, e.g., RHOPLEX® E-358. The high percentage of inert glass fibers helps to impart flame resistance or low flammability to the roving 20. In addition, the ratio of inert glass fibers to the active and/or flammable coating helps to eliminate or to at least substantially minimize/reduce smoke generated by the roving 20 when the roving 20 is exposed to a high temperature and/or in contact with a continuous flame. The roving 20, therefore, does not readily burn or ignite nor generate a significant amount of smoke.

The roving 20 can be used with various cable designs and cable components to add strength and reinforcement, while eliminating or at least substantially reducing use of relatively high cost strength materials, e.g., aramid fibers or high strength polyethylene. In one embodiment, the glass fibers 22 can be yellow in color such that the roving 20 mimics the typical color of aramid fibers.

The roving 20 is particularly suited for use as a strength member in an indoor cable, e.g., a fiber optic cable or a intra- or interbuilding network cable, because of its low flammability and low smoke generation properties. The roving 20 helps to provide flame resistance to a cable and can help to reduce an amount of smoke produced when the cable is exposed to a high temperature or a flame. The roving 20 thereby can help to minimize/reduce smoke and/or flame damage to a cable system and to areas, e.g., an equipment room, surrounding the cable system installation.

In addition, the roving 20 eliminates or at least substantially minimizes/reduces a need for the addition of flame retardant materials, e.g., fluorocarbons and TEFLON®, to the coating composition to help enhance the low smoke generation and low flammability properties of the roving 20. Eliminating or minimizing/reducing the use of flame retardant materials helps to maintain low costs to produce and to use the roving 20.

Figure 3:
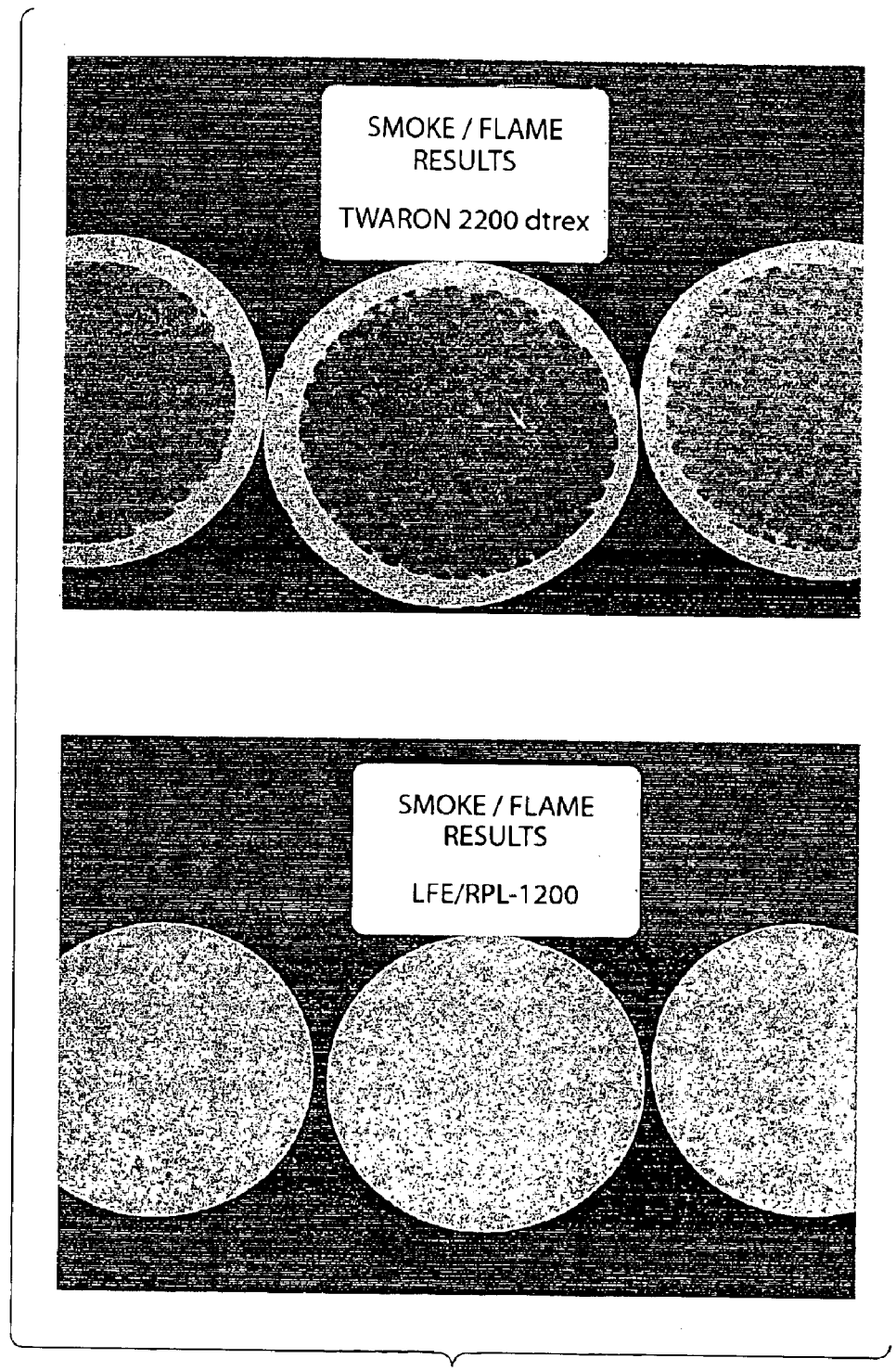
FIG. 3 is a photograph of results of a modified smoke test exposing the strength member according to the invention and aramid fibers to a continuous flame.

Referring to FIG. 3, a photograph of a modified smoke test is provided that demonstrates the low smoke generation properties and the low flammability properties of the roving 20 according to the invention. The roving 20 is indicated as LFE/RPL-1200 in FIG. 3, and aramid fibers are indicated as TWARON®, a registered trademark of Akzo of The Netherlands. As the photograph indicates, when in contact with a continuous flame, the roving 20 (LFE/RPL-1200) generates substantially minimal or no smoke. The photograph demonstrates an example of results of modified smoke tests conducted wherein the rovings 20 according to the invention and aramid fibers (TWARON®) are exposed to a continuous flame. The rovings 20 (LFE/RPL-1200) and the aramid fibers (TWARON®) are in contact with a continuous flame on a first side of a sheet of filter paper. A vacuum is provided on an opposite second side of the filter paper to create a draw. The draw pulls air from the first side of the filter paper through the filter paper to the second side of the filter paper. Smoke generated from the roving 20 (LFE/RPL-1200) and/or from the aramid fibers (TWARON®) is pulled through the filter paper with air as air is drawn through the filter paper. Smoke thereby deposits on the filter paper and discolors the filter paper, providing a visual indication of a presence of smoke. As the photograph indicates, the roving 20 (LFE/RPL-1200) according to the invention generates substantially minimal smoke, e.g., an amount of smoke that cannot be visually detected on a filter paper of a modified smoke test, or generates no smoke when in contact with a continuous flame. The photograph of FIG. 3 provides one illustration of the low smoke generation properties and the low flammability properties exhibited by the roving 20 according to the invention.

Referring to FIG. 4, results of oxygen index tests are reported in Table I that demonstrate the low flammability properties of the roving 20. A number of the rovings 20 according to the invention did not ignite or burn when subjected to a continuous flame in atmospheres comprised of less than about 40% oxygen. A number of tests were conducted in which a number of the rovings 20 according to the invention and aramid fibers were in contact with a continuous flame in atmospheres having from about 20% oxygen up to about 40% oxygen. In atmospheres having up to about 30% oxygen, the rovings 20 did not ignite or burn, e.g., indicated as "passed" in Table I. In comparison, the aramid fibers burned continuously, e.g., indicated as "failed" in Table I, in atmospheres having oxygen content of about 23% and higher. The rovings 20 demonstrate flame resistance and low flammability in comparison to the aramid fibers when exposed to a continuous flame in atmospheres of about 35% to about 40% oxygen. The rovings 20 melt and fuse, but resist igniting or burning, whereas aramid fibers burn continuously at these oxygen contents.

Figure 5:
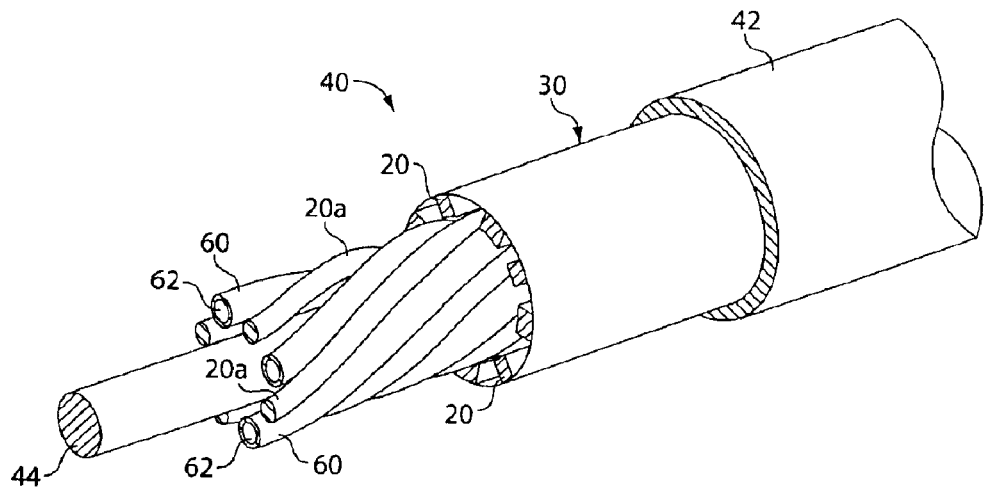
FIG. 5 is a perspective view of internal components of a cable including a plurality of the strength member shown in FIGS. 1 and 2.
Figure 6:
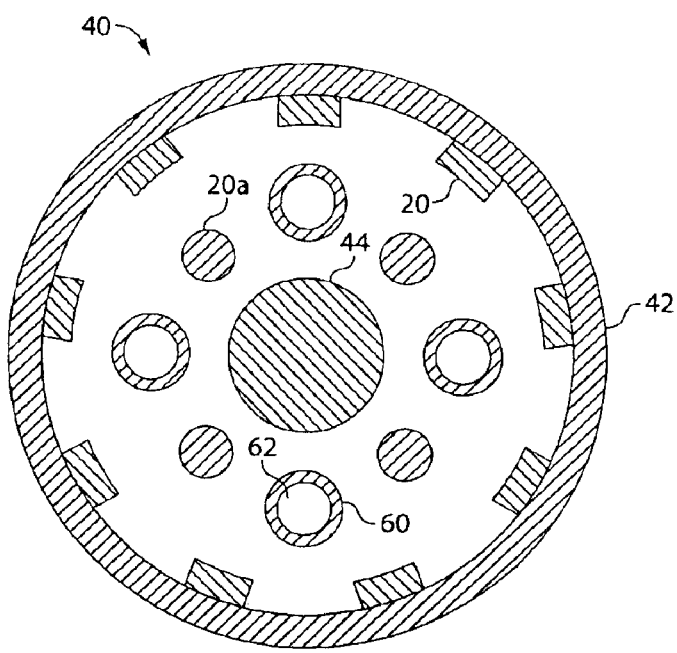
FIG. 6 is a cross-sectional view of the cable shown in FIG. 5.

Referring to FIGS. 5–6, the roving 20 can be used as strength member integrated with a cable 40, e.g., a fiber optic or copper data or communications cable, an intra- or interbuilding network cable or an aerial or other self-supporting cable, to help to strengthen, to reinforce and/or to protect the cable and one or more of its components. For instance, the roving 20 can be arranged with one or more cable components 62, e.g., optical fibers, to serve as strength members. In addition, or alternatively, the roving 20 can be used in a strength reinforcement system 30. The strength reinforcement system 30 can include a first plurality of yarn-like rovings 20 arranged between a cable jacket 42 and a plurality of optical fibers 62, e.g., each optical fiber contained by a buffer tube 60. The yarn-like rovings 20 can be arranged between the jacket 42 and the buffer tubes 60 and can extend substantially longitudinally along a center axis of the cable 40. Alternatively, or additionally, a second plurality of strand-like rovings 20a can be disposed among buffer tubes 60, e.g., between pairs of buffer tubes 60, such that each roving 20a and each buffer tube 60 are wound helically around a central core 44 of the cable 40 and extend substantially longitudinally along the center axis of the cable 40.

Figure 7:
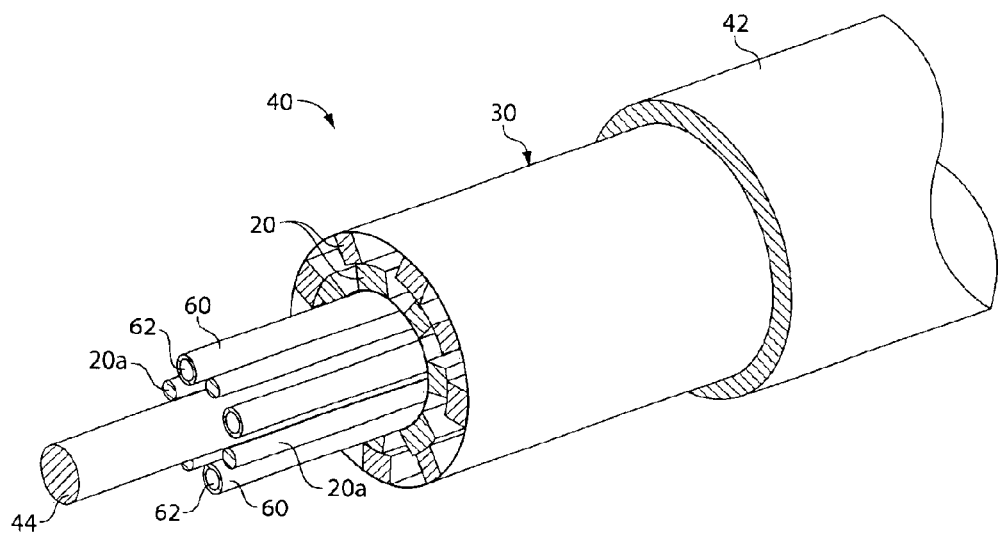
FIG. 7 is a perspective view of internal components of a cable including a plurality of strength members as shown in FIGS. 1 and 2.
Figure 8:
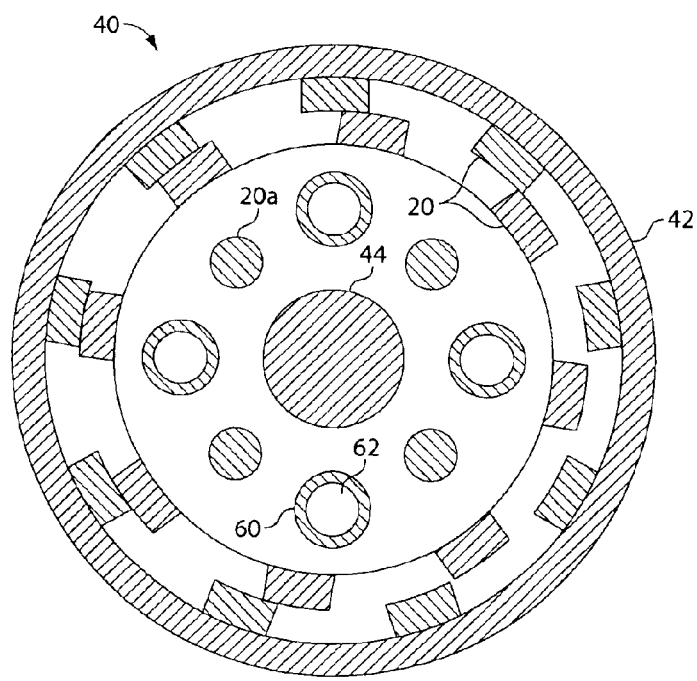
FIG. 8 is a cross-sectional view of the cable shown in FIG. 7.

Referring to FIGS. 7–8, the first plurality of rovings 20 can be disposed between the jacket 42 and the buffer tubes 60 and arranged in a layer-like manner and can extend substantially longitudinally along the center axis of the cable 40. The second plurality of rovings 20a can be disposed between adjacent buffer tubes 60 such that each roving 20 and each buffer tube 60 are disposed adjacent to the core 44 and extend substantially linearly along the longitudinal center axis of the cable 40.

Figure 9:
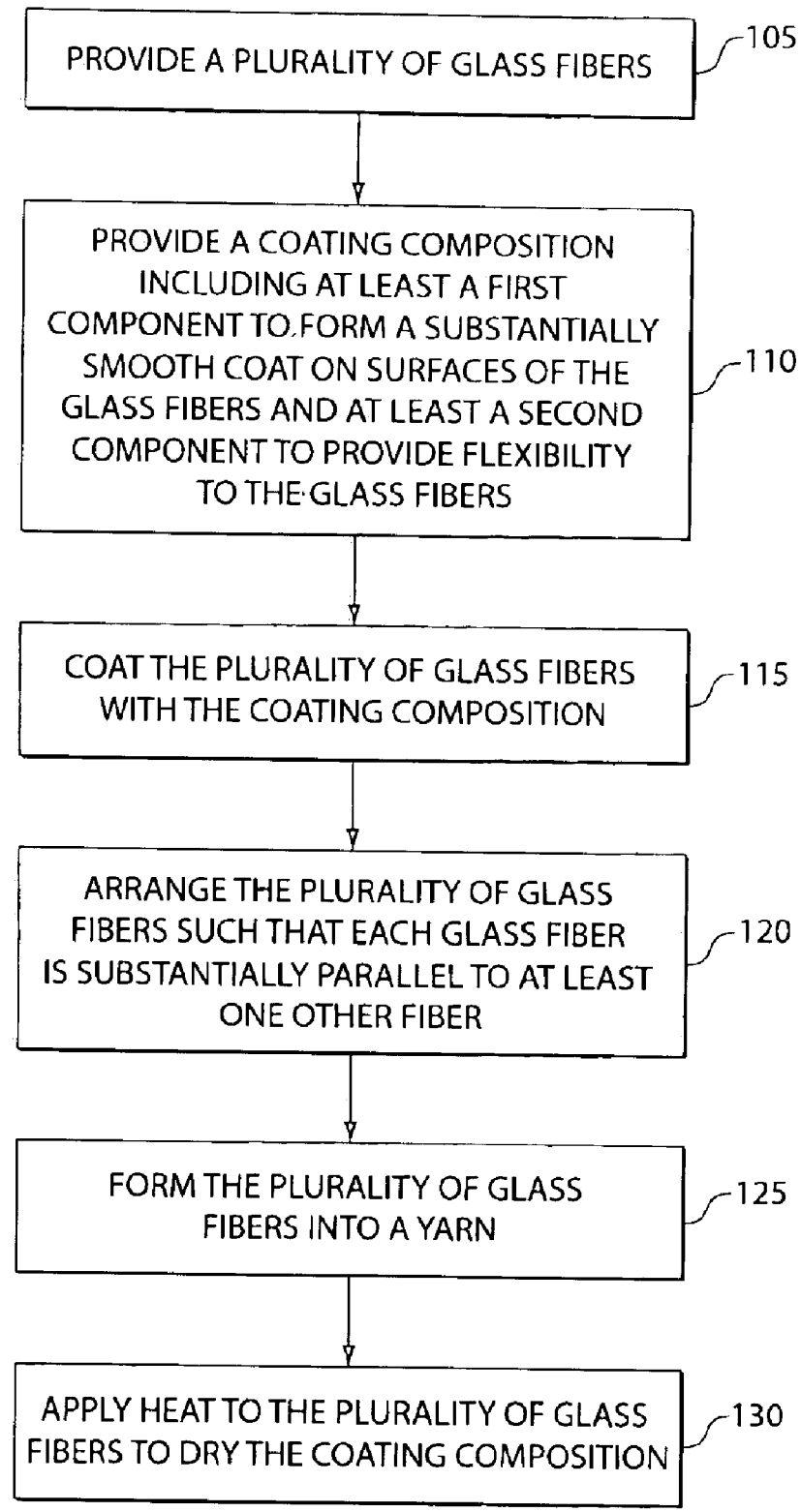
FIG. 9 is a block flow diagram of a process of making the strength member shown in FIGS. 1 and 2.

Referring to FIG. 9, with further reference to FIGS. 1–2, a process 100 for making a nonmetallic, nonconductive strength member includes the stages shown. The process 100, however, is exemplary only and not limiting. The process 100 can be altered, e.g., by having stages added, removed, or rearranged.

At stage 105, a plurality of elongated glass fibers 22 is provided wherein the glass fibers include from about 1,000 to about 2,500, and preferably about 1,600 fibers, and the roving 20 has a denier of from about 2,500 to about 22,000.

At stage 110, the coating composition is provided including at least a first component, e.g., MARSOFT™ NPE-20 present at a concentration of from about 10 to about 30% wt, and at least a second component, e.g., RHOPLEX® E-358 present at a concentration of from about 60 to about 85% wt.

At stage 115, the glass fibers 22 can be coated with the coating composition for a sufficient time to substantially coat each glass fiber, e.g., all, at least most of or a portion of a surface of each glass fiber 22 is coated with the coating composition, to form a surface coat.

At stage 120, when coated, the plurality of glass fibers 22 is arranged such that each glass fiber 22 is substantially parallel to at least one other glass fiber 22.

At stage 125, the glass fibers 22 are formed into the yarn 20 or the strand 20 by a method well known in the art, e.g., passing the glass fibers 22 through a die and/or molding the glass fibers 22.

At stage 130, heat is applied to the plurality of glass fibers 22 to dry the coating composition.

Other embodiments are within the scope and spirit of the appended claims. For example, a plurality of the rovings 20 according to the invention can be arranged to create a glass scrim or a glass sheath. The glass scrim can include, although is not limited to, a plurality of the rovings 20 interwoven, e.g., loosely woven in a pattern, with one another to create, for instance, a single layer or tubular-type glass scrim. The single layer glass scrim can, for instance, wrap helically around a central core of a cable with a plurality of optical fibers, whereas a tubular-type scrim can, for instance, encase a plurality of optical fibers to add strength and to provide protection to the optical fibers and the cable. Similarly, the glass sheath can include a plurality of the rovings 20 loosely interwoven in a pattern to form a structure that is configured to encase and/or contain one or more cable components within a cable interior.

Having described at least one aspect of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A strength member for use with a cable, the strength member comprising:
   a yarn including a plurality of elongated glass fibers arranged substantially parallel to one another along a central axis of the yarn, the yarn configured to define a cross section;
   each glass fiber being substantially coated with a coating, the coating including at least a first component that forms a substantially smooth coat on each glass fiber and substantially adheres each glass fiber with another glass fiber to form the yarn while enabling each glass fiber to be separable from another glass fiber, and least a second component that renders each glass fiber flexible and conformable to form the plurality of glass fibers into the yarn,
   wherein the coating is present at a percentage by weight of less than about 5 percent, and the yarn generates at least one of substantially minimal smoke and no smoke when in contact with a continuous flame.

2. The strength member of claim 1 wherein the plurality of glass fibers is present at a percentage by weight of greater than about 95 percent, and the coating is present at a percentage by weight of less than about 5 percent.

3. The strength member of claim 1 wherein the plurality of glass fibers is present at a percentage by weight of greater than about 98 percent.

4. The strength member of claim 1 wherein the coating is present at a percentage by weight of less than about 2 percent.

5. The strength member of claim 1 wherein the yarn does not ignite when in contact with a continuous flame in an atmosphere in which oxygen is present in a concentration of less than about 40 percent.

6. The strength member of claim 1 wherein the yarn includes a tensile strength of from about 50 to about 1,150 Newtons.

7. The strength member of claim 1 wherein the yarn includes a minimum tensile strength of greater than about 50 Newtons.

8. The strength member of claim 2 wherein the yarn generates substantially minimal smoke when in contact with a continuous flame, and does not ignite when in contact with a continuous flame in an atmosphere in which oxygen is present in a concentration of less than about 40 percent.

9. The strength member of claim 8 wherein the yarn includes a tensile strength of from about 50 to about 1,150 Newtons.

10. The strength member of claim 1 wherein the first component is selected from the group consisting of a resin, an adhesive, an acrylic, an acrylic resin, an acrylic emulsion, polyurethane, styrene butadiene rubber, latex, and any combination thereof.

11. The strength member of claim 1 wherein the first component is present at a concentration of from about 10 to about 90 percent by weight.

12. The strength member of claim 1 wherein the first component is present at a concentration of from about 60 to about 85 percent by weight.

13. The strength member of claim 1 wherein the second component is selected from the group consisting of a lubricant, a wax, silicone, a textile finish, a starch-based sizing, an acrylic, an acrylic emulsion, polyacrylamide, and any combination thereof.

14. The strength member of claim 1 wherein the second component is present at a concentration of from about 10 to about 90 percent by weight.

15. The strength member of claim 1 wherein the second component is present at a concentration of from about 10 to about 30 percent by weight.

16. The strength member of claim 1 wherein the first component is present at a concentration of about 75 to about 95 percent by weight, and the second component is present at a concentration of about 15 to about 40 percent by weight.

17. The strength member of claim 1 wherein the plurality of glass fibers is selected from the group consisting of E-glass fibers, ECR-glass fibers, S-glass fibers, continuous glass fibers, and any combination thereof.

18. The strength member of claim 1 wherein the strength member includes a denier of from about 2,500 and to about 22,000.

19. A strength member for use with a cable, the strength member comprising:
   a yarn including a plurality of elongated glass fibers arranged substantially parallel to one another along a central axis of the yarn;
   each glass fiber being substantially coated with a coating, the coating including at least a first component that forms a substantially smooth coat on each glass fiber, and at least a second component that renders each glass fiber flexible to form the plurality of glass fibers into the yarn,
   wherein the coating is present at a percentage by weight of less than about 5 percent, and wherein the first component includes RHOPLEX® E-358.

20. A strength member for use with a cable, the strength member comprising:

a yarn including a plurality of elongated glass fibers arranged substantially parallel to one another along a central axis of the yarn;

each glass fiber being substantially coated with a coating, the coating including at least a first component that forms a substantially smooth coat on each glass fiber, and at least a second component that renders each glass fiber flexible to form the plurality of glass fibers into the yarn, wherein the coating is present at a percentage by weight of less than about 5 percent, and wherein the second component includes MARSOFT™ NPE-20.

21. A strength reinforcement system for use with a cable, the system comprising:

a plurality of strength members, each strength member including:

a yarn constructed of a plurality of elongated glass fibers arranged substantially parallel to one another along a central axis of the yarn, each glass fiber being substantially coated with a coating, the coating including at least a first component that forms a substantially smooth coat on each glass fiber and substantially adheres each glass fiber with another glass fiber to form the yarn while enabling each glass fiber to be separable from another glass fiber; at least a second component that renders each glass fiber flexible and conformable to form the plurality of glass fibers into the yarn, wherein the coating is present at a percentage by weight of less than about 5 percent and the yarn generates at least substantially minimal smoke when in contact with a continuous flame.

22. The system of claim 21 wherein the plurality of glass fibers is present at a percentage by weight of greater than about 95 percent, and the coating is present at a percentage by weight of less than about 5 percent.

23. The system of claim 21 wherein the plurality of glass fibers is present at a percentage by weight of greater than about 98 percent.

24. The system of claim 21 wherein the coating is present at a percentage by weight of less than about 2 percent.

25. The system of claim 21 wherein the yarn does not ignite when in contact with a continuous flame in an atmosphere in which oxygen is present in a concentration of less than about 40 percent.

26. The system of claim 21 wherein the yarn includes a tensile strength of from about 50 to about 1,150 Newtons.

27. The system of claim 21 wherein the yarn includes a minimum tensile strength of greater than about 50 Newtons.

28. The system of claim 22 wherein the yarn generates substantially minimal smoke when in contact with a continuous flame, and does not ignite when in contact with a continuous flame in an atmosphere in which oxygen is present in a concentration of less than about 40 percent.

29. The system of claim 22 wherein the yarn includes a tensile strength of from about 50 to about 1,150 Newtons.

30. The system of claim 22 wherein the yarn includes a minimum tensile strength of greater than about 50 Newtons.

31. The system of claim 22 wherein the first component is selected from the group consisting of a resin, an adhesive, an acrylic, an acrylic resin, an acrylic emulsion, polyurethane, styrene butadiene rubber, latex, and any combination thereof.

32. The system of claim 21 wherein the first component is present at a concentration of from about 10 to about 90 percent by weight.

33. The system of claim 21 wherein the first component is present at a concentration of from about 60 to about 85 percent by weight.

34. The system of claim 21 wherein the second component is selected from the group consisting of a lubricant, a wax, silicone, a textile finish, a starch-based sizing, an acrylic, an acrylic emulsion, polyacrylamide, and any combination thereof.

35. The system of claim 21 wherein the second component is present at a concentration of from about 10 to about 90 percent by weight.

36. The system of claim 21 wherein the second component is present at a concentration of from about 10 to about 30 percent by weight.

37. The system of claim 21 wherein the first component is present at a concentration of from about 75 to about 95 percent by weight and the second component is present at a concentration of from about 15 to about 40 percent by weight.

38. The system of claim 21 wherein the plurality of glass fibers is selected from the group consisting of E-glass fibers, ECR-glass fibers, S-glass fibers, continuous glass fibers, and any combination thereof.

39. The system of claim 21 wherein the strength member includes a denier of from about 2,500 and to about 22,000.

40. The system of claim 21 wherein the strength member includes a denier of from about 3,500 to about 4,000.

41. A strength reinforcement system for use with a cable, the system comprising:

a plurality of strength members, each strength member including:

a yarn constructed of a plurality of elongated glass fibers arranged substantially parallel to one another along a central axis of the yarn, each glass fiber being substantially coated with a coating, the coating including at least a first component that forms a substantially smooth coat on each glass fiber and at least a second component that renders each glass fiber flexible to form the plurality of glass fibers into the yarn, wherein the coating is present at a percentage by weight of less than about 5 percent, and wherein the first component includes RHOPLEX® E-358.

42. A strength reinforcement system for use with a cable, the system comprising:

a plurality of strength members, each strength member including:

a yarn constructed of a plurality of elongated glass fibers arranged substantially parallel to one another along a central axis of the yarn, each glass fiber being substantially coated with a coating, the coating including at least a first component that forms a substantially smooth coat on each glass fiber and at least a second component that renders each glass fiber flexible to form the plurality of glass fibers into the yarn, wherein the coating is present at a percentage by weight of less than about 5 percent, and wherein the second component includes MARSOFT™ NPE-20.

43. A method for making an elongated strength member for use in a cable, the method comprising:

providing a plurality of elongated glass fibers;

providing a coating including at least a first component that forms a substantially smooth coat on each glass fiber and substantially adheres each glass fiber with another glass fiber to form the yarn while enabling each glass fiber to be separable from another glass fiber, and at least a second component that renders each glass fiber flexible and conformable to form the plurality of glass fibers into the yarn;

coating the plurality of glass fibers with the coating to substantially coat each glass fiber;

arranging the plurality of glass fibers substantially parallel to one another;

forming the plurality of glass fibers into an elongated yarn, the elongated yarn configured to define a cross section; and drying the coating, wherein the coating is present at a percentage by weight of less than about 5 percent.

44. The method of claim 43 wherein the plurality of glass fibers is present at a percentage by weight of greater than about 95 percent, and the coating is present at a percentage by weight of less than about 5 percent.

45. The method of claim 43 wherein providing a plurality of elongated glass fibers includes providing a plurality of elongated glass fibers selected from the group consisting of E-glass fibers, ECR-glass fibers, S-glass fibers, continuous glass fibers, and any combination thereof.

46. The method of claim 43 wherein the first component is selected from the group consisting of a resin, an adhesive, an acrylic, an acrylic resin, an acrylic emulsion, polyurethane, styrene butadiene rubber, latex, and any combination thereof.

47. The method of claim 43 wherein the first component is present at a concentration of from about 60 to about 85 percent by weight.

48. The method of claim 43 wherein the second component is selected from the group consisting of a lubricant, a wax, silicone, a textile finish, a starch-based sizing, an acrylic, an acrylic emulsion, polyacrylamide, and any combination thereof.

49. The method of claim 43 wherein the second component is present at a concentration of from about 10 to about 30 percent by weight.

50. The method of claim 43 wherein the first component is present at a concentration of from about 10 to about 90 percent by weight and the second component is present at a concentration of from about 10 to about 90 percent by weight.

51. The method of claim 43 wherein the yarn does not ignite when in contact with a continuous flame in an atmosphere in which oxygen is present in a concentration of less than about 40 percent.

52. The method of claim 43 wherein the yarn includes a tensile strength of from about 50 to about 1,150 Newtons.

53. The method of claim 43 wherein drying the coating includes applying heat to the plurality of glass fibers when coated.

54. A method for making an elongated strength member for use in a cable, the method comprising:

providing a plurality of elongated glass fibers;

providing a coating including at least a first component that forms a substantially smooth coat on each glass fiber and at least a second component that renders each glass fiber flexible to form the plurality of glass fibers into the yarn;

coating the plurality of glass fibers with the coating to substantially coat each glass fiber;

arranging the plurality of glass fibers substantially parallel to one another;

forming the plurality of glass fibers into an elongated yarn; and drying the coating, wherein the coating is present at a percentage by weight of less than about 5 percent, and wherein the first component includes RHOPLEX® E-358.

55. A cable comprising:

a cable jacket, the cable jacket defining an interior having elongated generally circular cylindrical shape;

a core disposed within the cable jacket interior to extend longitudinally along a center axis of the cable jacket;

one or more conductors disposed within the cable jacket interior and arranged around the core such that the one or more conductors extend longitudinally along the center axis of the cable jacket; and one or more strength members disposed within the cable jacket interior extending longitudinally along the center axis of the cable jacket, wherein each of the one or more strength members includes:

a yarn comprising a plurality of elongated glass fibers arranged substantially parallel to one another along a central axis of the yarn, the yarn configured to define a cross section;

each glass fiber being substantially coated with a coating, the coating including at least a first component that forms a substantially smooth coat on each glass fiber and substantially adheres each glass fiber with another glass fiber to form the yarn while enabling each glass fiber to be separable from another glass fiber, at least a second component that renders each glass fiber flexible and conformable to form the plurality of glass fibers into the yarn, the yarn configured to define a cross section, and wherein the coating is present at a percentage by weight of less than about 5 percent and the yarn generates at least substantially minimal smoke in contact with a continuous flame.

56. The cable of claim 55 wherein the plurality of glass fibers is present at a percentage by weight of greater than about 95 percent, and the coating is present at a percentage by weight of less than about 5 percent.

57. The cable of claim 55 wherein each of the one or more strength members is disposed and arranged adjacent to the one or more conductors and around the cable core.

58. A cable comprising:

a cable jacket, the cable jacket defining an interior having an elongated generally circular cylindrical shape;

one or more conductors disposed within the cable jacket interior such that the one or more conductors extend along longitudinally along a center axis of the cable jacket; and one or more strength members disposed and arranged among the one or more conductors such that the one or more strength members extend longitudinally along the center axis of the cable jacket, wherein each of the one or more strength members includes:

a yarn comprising a plurality of elongated glass fibers arranged substantially parallel to one another along a central axis of the yarn, the yarn configured to define a cross section;

each glass fiber being substantially coated with a coating, the coating including at least a first component that forms a substantially smooth coat on each glass fiber and substantially adheres each glass fiber with another glass fiber to form the yarn while enabling each glass fiber to be separable from another glass fiber, at least a second component that renders each glass fiber flexible and conformable to form the plurality of glass fibers into the yarn, the yarn configured to define a cross section, and wherein the coating is present at a percentage by weight of less than about 5 percent and the yarn generates at least substantially minimal smoke when in contact with a continuous flame.

59. The cable of claim 58 wherein the plurality of glass fibers is present at a percentage by weight of greater than about 95 percent, and the coating is present at a percentage by weight of less than about 5 percent.

60. A method for making an elongated strength member for use in a cable, the method comprising:

providing a plurality of elongated glass fibers;

providing a coating including at least a first component that forms a substantially smooth coat on each glass fiber and at least a second component that renders each glass fiber flexible to form the plurality of glass fibers into the yarn;

coating the plurality of glass fibers with the coating to substantially coat each glass fiber;

arranging the plurality of glass fibers substantially parallel to one another;

forming the plurality of glass fibers into an elongated yarn; and drying the coating, wherein the coating is present at a percentage by weight of less than about 5 percent, and wherein the second component includes MARSOFT™ NPE-20.

* * * * *